United States Patent
Haynes et al.

(10) Patent No.: US 12,184,072 B2
(45) Date of Patent: Dec. 31, 2024

(54) PHASOR IDENTIFICATION VIA SYNCHRONOUS MESSAGING

(71) Applicant: Aclara Technologies LLC, St. Louis, MO (US)

(72) Inventors: David Haynes, St. Peters, MO (US); Christopher Fleck, St. Louis, MO (US); Roger Smith, Gibsonia, PA (US); Rebecca Ross, Apollo, PA (US)

(73) Assignee: Aclara Technologies LLC, St. Louis, MO (US)

( * ) Notice: Subject to any disclaimer, the term of this patent is extended or adjusted under 35 U.S.C. 154(b) by 587 days.

(21) Appl. No.: 17/378,205

(22) Filed: Jul. 16, 2021

(65) Prior Publication Data
US 2022/0021208 A1   Jan. 20, 2022

Related U.S. Application Data

(60) Provisional application No. 63/053,189, filed on Jul. 17, 2020.

(51) Int. Cl.
*H02J 3/08* (2006.01)
*H02J 13/00* (2006.01)
*H04W 4/12* (2009.01)

(52) U.S. Cl.
CPC .......... *H02J 3/08* (2013.01); *H02J 13/00002* (2020.01); *H02J 13/00026* (2020.01); *H04W 4/12* (2013.01); *H02J 2203/10* (2020.01)

(58) Field of Classification Search
CPC .. H02J 3/08; H02J 13/00002; H02J 13/00026; H02J 2203/10; H02J 3/242;

(Continued)

(56) References Cited

U.S. PATENT DOCUMENTS

2007/0247139 A1\* 10/2007 Veroni .................. G01R 29/18
324/84
2014/0028282 A1   1/2014 Perry et al.
(Continued)

FOREIGN PATENT DOCUMENTS

WO   2018027180   2/2018

OTHER PUBLICATIONS

PCT/US2021/042020 International Search Report and Written Opinion dated Oct. 14, 2021 (23 pages).

*Primary Examiner* — Rami R Okasha
(74) *Attorney, Agent, or Firm* — Michael Best & Friedrich LLP (57) ABSTRACT

A node in a power distribution system is described. The node includes an electrical connection to a single-phase power signal from an AC mains power source, a wireless communication interface configured to receive a first phase synchronization message, and a controller. The controller is configured to determine whether the first phase synchronization message is acceptable and detect a zero-crossing event on the single phase power signal subsequent to the receipt of the first phase synchronization message in response to determining that the first phase synchronization message is acceptable. The controller is further configured to calculate a time difference between the receipt of the first phase synchronization signal and the detected zero-crossing event, determine a local phase angle based on the time difference, and establish an identity of the single phase power signal based on the local phase angle.

14 Claims, 7 Drawing Sheets

(58) Field of Classification Search
CPC . H04W 4/12; H04W 4/20; H04W 4/70; Y02E 40/70; Y02E 60/00; Y04S 10/22; Y04S 10/30; Y04S 40/126
See application file for complete search history.

(56) References Cited

U.S. PATENT DOCUMENTS

| | | | |
|---|---|---|---|
| 2016/0154040 A1* | 6/2016 | Driscoll | G01D 4/002 |
| | | | 324/76.77 |
| 2016/0198245 A1 | 7/2016 | Rhoads et al. | |
| 2018/0031617 A1 | 2/2018 | Rieken et al. | |
| 2019/0086461 A1* | 3/2019 | Dale | G01R 21/133 |

* cited by examiner

PHASOR IDENTIFICATION VIA SYNCHRONOUS MESSAGING

CROSS-REFERENCE TO RELATED APPLICATION

This application claims priority to, and the benefit of, U.S. Provisional Patent Application No. 63/053,189, filed Jul. 17, 2020, the contents of which are incorporated herein.

FIELD

The embodiments disclosed herein relate to phase determination within power distribution networks.

BACKGROUND

In power distribution networks having multi-phase power provided to multiple distribution locations, it can be difficult to accurately determine to which phase a device is connected.

SUMMARY

According to one embodiment a node in a power distribution system is described. The node includes an electrical connection to a single-phase power signal from an AC mains power source, a wireless communication interface configured to receive a first phase synchronization message, and a controller. The controller is configured to determine whether the first phase synchronization message is acceptable and detect a zero-crossing event on the single phase power signal subsequent to the receipt of the first phase synchronization message in response to determining that the first phase synchronization message is acceptable. The controller is further configured to calculate a time difference between the receipt of the first phase synchronization signal and the detected zero-crossing event, determine a local phase angle based on the time difference, and establish an identity of the single phase power signal based on the local phase angle.

In another embodiment, a method for determining a phase identity of a node device coupled to a phase of a multi-phase AC distribution system is described. The method includes receiving a first phase synchronization message, determining whether the first phase synchronization message is acceptable, and detecting a zero-crossing event on the phase subsequent to the receipt of the first phase synchronization message in response to determining that the first phase synchronization message is acceptable. The method also include calculating a time difference between the receipt of the first phase synchronization message and the detected zero-crossing event, determining a local phase angle based on the time difference, and establishing an identity of the phase based on the local phase angle.

In another embodiment, a monitoring system for a power distribution network is described. The system includes a first node coupled to a first phase of the power distribution network. The first node is configured to determine whether an identity of the first phase is known and generate a first phase synchronization message in response to determining that the identity of the first phase is known. The first node is further configured to monitor the first phase for a zero-crossing event and transmit the first phase synchronization message in response to detecting the zero-crossing event.

Other aspects of the technology will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if examples in this document state that "item Z may comprise element A or B," this may be interpreted to disclose an item Z comprising only element A, an item Z comprising only element B, as well as an item Z comprising elements A and B.

As used herein, "node" may refer to a Data Concentrator Unit (DCU), an end point, an end device, a power grid sensor with communication capabilities, a utility meter (e.g. an electrical meter), or a hand-held or hot-stick mounted tool or device used by a lineman.

Figure 1:
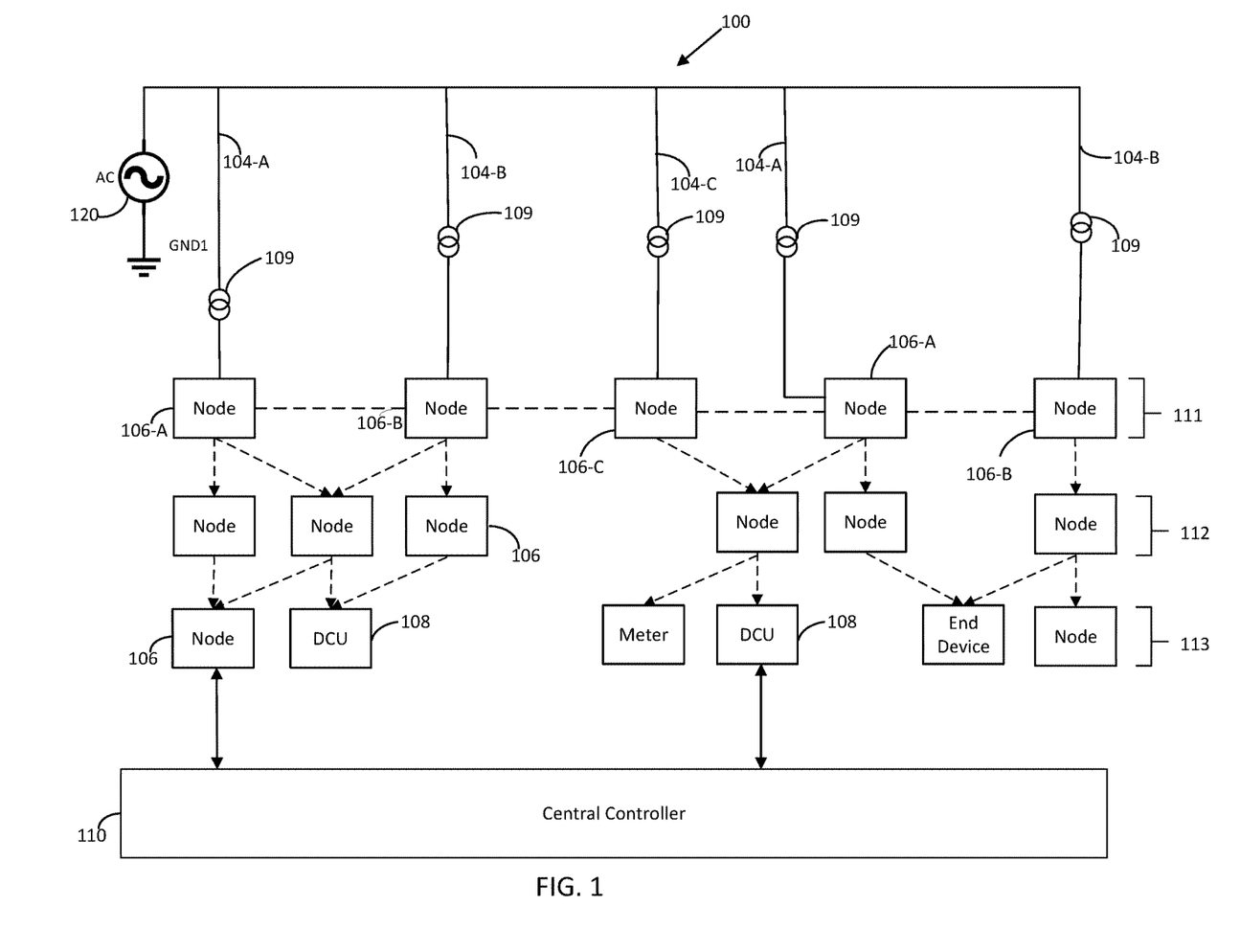
FIG. 1 is a schematic illustration of the hierarchical organization of nodes and node devices within a power distribution system.

FIG. 1 illustrates an example phase determination system 100, in accordance with an embodiment of the disclosure. The phase determination system 100 include a power distribution network 104 and one or more nodes 106. In one embodiment, the nodes 106 may be metering devices, such as electrical metering devices (residential, commercial, industrial, etc.). In other embodiments, the nodes 106 are coupled to a metering device or other devices within a power distribution network. The nodes 106 may be mechanically, electrically, and/or communicatively connected to aspects of the power distribution network 104. The system 100 may further include one or more data collection units ("DCU") 108. In some examples, the DCUs 108 are node devices 106 that have enhanced communication capabilities, such as longer transmission and/or receive ranges, additional communication bandwidth, additional communication modes (e.g. digital, analog, cellular, etc.), and the like. For example, the DCUs 108 may be node devices 106 that are coupled to more capable antennas, which can provide the additional communication capabilities. Additionally, DCUs 108 may have more powerful transmitters to allow for greater transmission range. The DCUs 108 may also be referred to as regional nodes or supervisory nodes due to their ability to communicate over larger distances.

As illustrated in FIG. 1, a node 106 may be connected to a transformer 109 (e.g., distribution transformers that step-down medium voltage to low voltage). The node 106 may also be in electronic communication with one or more other nodes 106 to facilitate communication between the nodes 106. For example, nodes 106 may be connected to one or more other nodes 106 using wireless protocols, such as cellular (e.g. 3G, 4G, LTE, CDMA, etc.), RF, ZigBee, Bluetooth, Wi-Fi, Wi-Max, LoRa, or other applicable wireless protocols. The nodes 106 may further be in communication with a central controller 110. The nodes 106 may communicate with the central controller 110 via a wireless communication protocol, such as those described above. In some examples, the nodes 106 may communicate with the central controller 110 via a wired connection, such as via a wired internet connection. However, other wired connections, such as power line communication ("PLC") are also contemplated. The central controller 110 may be a server-based controller, a cloud-based controller, or other centralized computing system configured to perform various operations as described herein. In some examples, one of the nodes 106 may be configured to act as the central controller 110.

In one embodiment, the power distribution network 104 includes distribution lines each adapted to carry electric power. Each distribution line may be connected to one phase of a multi-phase power distribution system. For example, a distribution line 104-A may be adapted to carry electric power having Phase A to one or more node devices 106-A, a distribution line 104-B may be adapted to carry electric power having Phase B to one or more node devices 106-B, and a distribution line 104-C may be adapted to carry electric power having Phase C to one or more node devices 106-C. In one embodiment, distribution lines of the power distribution network 104 may carry electric power having a combination of Phase A, Phase B, and/or Phase C to node devices 106. For example, when the system includes delta-Y and/or Y-delta transformers the phases of the outputs of these transformers will not be pure Phase A, Phase B, or Phase C, but instead may be a combination of Phase A, Phase B, and/or Phase C.

The nodes 106 may be placed on the power distribution network 104 at an endpoint within the distribution network 104. However, in other embodiments the nodes 106 may be placed at intermediate locations within the distribution network 104, such as in commercial, residential, or industrial substations. In some implementations, the nodes 106 may be mounted to power line poles at specified intervals to ensure proper coverage. In some embodiments, the nodes 106 are placed at multiple locations within the system 100 to facilitate communication between the nodes 106 and/or other devices as needed. For example, the nodes 106 may be positioned every 5-10 miles to ensure communication between nodes 106 can be maintained. In other embodiments, the nodes 106 may be positioned such that one or more nodes 106 can facilitate communication between themselves and other devices within the system 100. The distance between nodes may vary based on factors such as communication protocols, geography, etc.

In some systems, accurately determining the phase connections of nodes 106 may be difficult as the locations of the nodes 106 increase in distance from an AC mains power source 120. For example, an installer may not be able to directly trace a distribution line back to a specific phase output from a transformer 109 or other distribution device. In contrast, a phase of a node 106 connection near to an AC main power source or distribution device (e.g. transformer 109) may generally be verified easily and quickly due to at least to the ability to directly follow the distribution line back to the source.

In some embodiments, the nodes 106 may be organized according to a hierarchy of tiers with respect to the AC mains power source 120, such as a power substation. In the example shown in FIG. 1, a first-tier 111 of nodes 106, a second-tier 112 of nodes 106, and a third-tier 113 of nodes 106 are present. The tiers 111, 112, 113, represent levels of removal from the AC mains power source 120 for the power distribution network 104. In one embodiment, one or more of the nodes 106 may be reference nodes. Reference nodes may be node devices 106 located in close proximity to the AC mains power source 120, such as in a substation yard, and can be verified to be coupled to a specific phase of the distribution network 104. Further, the reference node may be selected due to its proximity to the AC mains power source 120 to reduce the likelihood that it would be coupled to a different phase over time, such as during a load balancing operation. In some embodiments, a distribution network 104 may only include a single reference node. However, in other embodiments, the distribution network 104 may have more than one reference node, such as one reference node for each phase. Where there are multiple reference nodes, all reference nodes should generally be within communication range of each other to validate each other's transmissions and/or messages. As the connected phase of a reference node is verified, a reference node is configured to generate and transmit phase synchronization messages as described herein. In some cases, there may be no difference in technological equipment between a reference node and other nodes 106. The designation of "reference node" simply implies that the node 106 so designated has a verified phase connection. In one example, a reference node is designated as such during installation. As will be described in more detail, the nodes 106 include one or more circuits to determine or collect a sample of the voltage waveform for the coupled phase. In some examples, the nodes 106 include circuitry to detect a zero-crossing of a sinusoidal waveform. As a reference node can determine a zero-crossing of the sinusoidal waveform, and has a verified phase connection, a reference node may be configured to calculate a timing of other phasor voltage zero-crossings.

As noted above, the nodes 106 may be separated into various tiers based on their location, among other factors. The tiers 111, 112, and 113 may be established within the power distribution network 104 by way of wireless transmission and reception of phase synchronization messages. For example, reference nodes 106 closest to the AC mains power source 120 may broadcast information about their phase angle and tier via a phase synchronization message so that nodes 106 located farther away from the AC mains power source 120 may determine their own tier and local phase angle based on the information received via the phase synchronization message. As will be described in more detail below, the nodes 106 receiving the phase synchronization messages may determine their own tier within the system 100 based on receiving a phase synchronization message from a node 106 of a higher tier (e.g. closer to the AC mains power source 120) and incrementing the tier value contained in the phase synchronization message. Alternatively, where a node 106 receives a broadcast from a node 106 of an equal or lower tier, the node 106 may simply discard the phase synchronization message. The capabilities of the nodes 106 as well as this wireless communication and phase connection identification process are described in further detail below.

Figure 2:
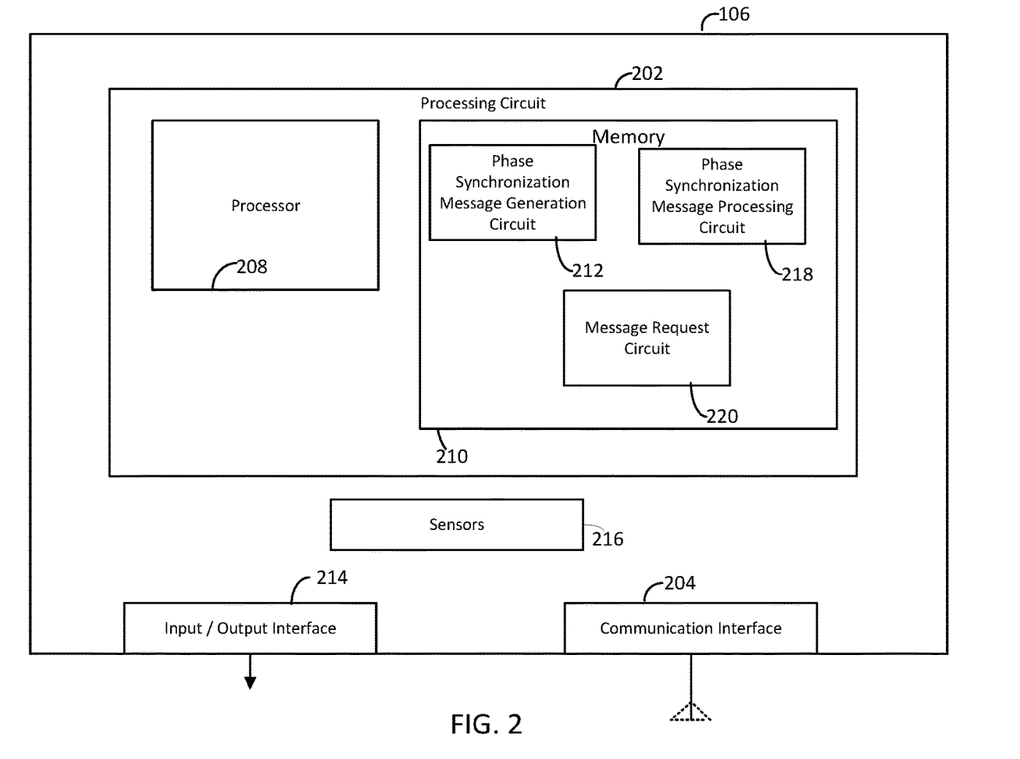
FIG. 2 is a block diagram illustrating the functioning components of a node in a power distribution system.

Turning now to FIG. 2, a block diagram of a node 106 is shown, according to some embodiments. The node 106 may be a standalone device, or may be a part of one or more devices, such as power meters, switchgear, etc. As shown in FIG. 2, the node 106 includes a processing circuit 202, a communication interface 204, an input/output (I/O) interface 214, and one or more sensors 216. The processing circuit 202 includes an electronic processor 208 and a memory 210. The processing circuit 202 may be communicably connected to one or more of the communication interface 204 and the I/O interface 214. The electronic processor 208 may be implemented as a programmable microprocessor, an application specific integrated circuit (ASIC), one or more field programmable gate arrays (FPGA), a group of processing components, or with other suitable electronic processing components.

The memory 210 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 210 may include database components, object code components, script components, or other types of code and information for supporting the various activities and information structure described in the present application. According to one example, the memory 210 is communicably connected to the electronic processor 208 via the processing circuit 202 and may include computer code for executing (for example, by the processing circuit 202 and/or the electronic processor 208) one or more processes described herein.

The communication interface 204 is configured to facilitate communication between the node 106 and one or more external devices or systems, the central controller 110, and/or one or more other nodes 106. The communication interface 204 may be, or include, wireless communication interfaces (for example, antennas, transmitters, receivers, transceivers, etc.) for conducting data communications between the node 106 and one or more external devices, such as another node 106 or the central controller 110. In some embodiments, the communication interface 204 utilizes a proprietary protocol for communicating with other nodes 106 or the central controller 110. For example, the proprietary protocol may be an RF-based protocol configured to provide efficient and effective communication between the nodes 106 and other devices. In other embodiments, other wireless communication protocols may also be used, such as cellular (3G, 4G, 5G, LTE, CDMA, etc.), Wi-Fi, LoRa, LoRaWAN, Z-wave, Thread, and/or any other applicable wireless communication protocol.

The I/O interface 214 may be configured to interface directly with one or more devices, such as a power supply, a power monitor, etc. In one embodiment, the I/O interface 214 may utilize general purpose I/O (GPIO) ports, analog inputs, digital inputs, etc. The sensors 216 may include one or more sensors configured to monitor one or more aspects of a distribution line coupled to the node 106. For example, the sensors 216 may include voltage sensors, current sensors, temperature sensors, and other sensors as required for a given application. In some embodiments, the sensors 216 include one or more connections between the node 106 and the connected distribution line. In other examples, the sensors 216 may be connected to the distribution line using the I/O interface 214.

As described above, the memory 210 may be configured to store various processes, layers, and modules, which may be executed by the electronic processor 208 and/or the processing circuit 202. In one embodiment, the memory 210 includes a phase synchronization message generation circuit 212. The phase synchronization message generation circuit 212 is configured to generate, in concert with the electronic processor 208, a phase synchronization message for establishing a common phase reference between nodes 106 of different tiers. In one embodiment, the phase synchronization message is transmitted using the communication interface 204, such as by using the wireless communication protocols described above.

The memory 210 may also include a phase synchronization message processing circuit 218. The phase synchronization message processing circuit 218 may be configured to receive a phase synchronization message from a reference node 106, predict or detect a zero crossing of a power signal on a power line coupled to the node 106, and/or determine a time difference between the receipt of the phase synchronization message and the detected zero crossing. This process will be described in more detail below. In some examples, the phase synchronization message processing circuit 218 may communicate with the sensors 216 to detect the zero-crossing of the power signal. The memory may further include a message request circuit 220 configured to transmit a request message to request a phase synchronization message, as described in more detail below.

Figure 3:
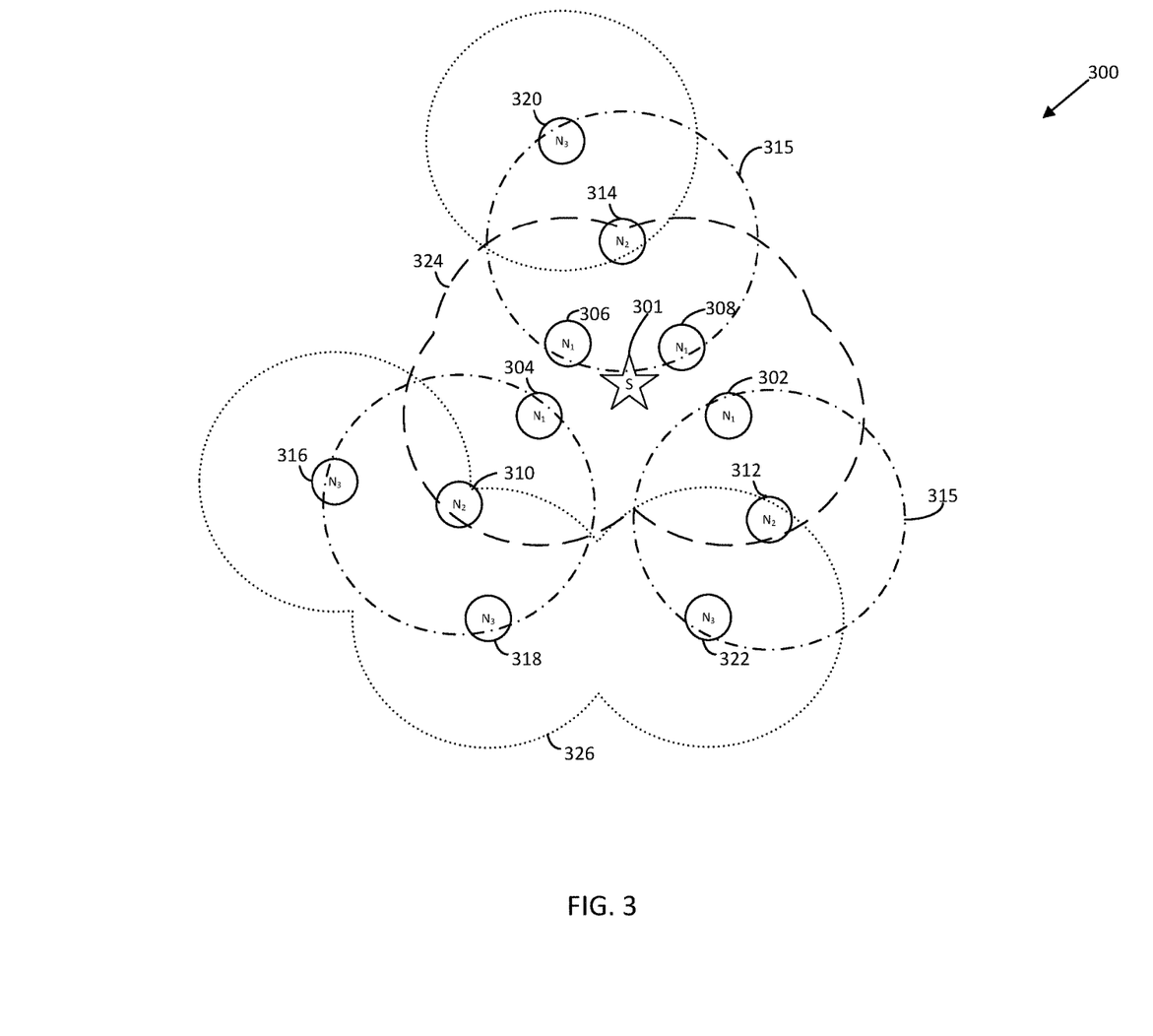
FIG. 3 is network diagram illustrating one exemplary embodiment of the phase determination system, according to some embodiments.

Turning now to FIG. 3 a network diagram shows a network 300 of tiered nodes, according to some embodiments. The network 300 includes a number of first-tier nodes 302, 304, 306, 308, a number of second-tier nodes 310, 312, 314, and a number of third-tier nodes 316, 318, 320, 322. The first-tier nodes 302, 304, 306, 308 may be designated as reference nodes, as described above. Each of the nodes may have an associated wireless communication coverage area associated therewith. The wireless communication coverage area represents the area over which the node may receive and/or transmit various wireless communication messages, such as phase synchronization messages. As shown in FIG. 3, wireless communication areas 311, 313, and 315 are associated with nodes 310, 312, and 314, respectively. In some embodiments, the nodes may also have a combined wireless coverage area. In one embodiment, the combined wireless coverage areas are related to the reach of wireless communications of a particular tier of nodes. For example, each of first-tier nodes 302, 304, 306, and 308 may have their own coverage areas as well as an overlapping coverage area. As shown in FIG. 3, the first-tier nodes 302, 304, 306, and 308 have an overlapping first-tier coverage area 324. Similarly, the third-tier nodes have an overlapping third-tier coverage area 326. Other tiers of nodes including second-tier nodes or tiers beyond the third-tier may also have overlapping coverage areas as well as individual coverage areas.

As shown in FIG. 3, one or more nodes (e.g. node devices, DCUs, end points or end devices), 310, 312, 314 may be within the coverage area of at least one higher tier node. For example, second-tier node 312 is located within the coverage area 324 of first-tier node 302, and node 312 and therefore may receive phase synchronization messages from first-tier node 302. Similarly, third-tier node 322 is located within the coverage area 313 of second-tier node 312, and therefore may receive phase synchronization messages from second-tier node 312. Second-tier node 312 is also within the overlapping coverage area 326 of third-tier node 322, and communications may therefore occur both ways between second-tier node 312 and third-tier node 322. Second-tier node 314 is located within the overlapping coverage area 324 of first-tier nodes 302, 304, 306 and 308. Such overlapping coverage may increase the capability of upper tier nodes to communicate with lower tier nodes despite various conditions affecting the RF signal, such as distance, weather, obstructions, atmospheric conditions, etc.

In some embodiments, one or more nodes may be configured such that the nodes can communicate to other networks or to other components within the network 300, such as other nodes, central controllers (such as central controller 110), or other applicable devices within the network 300 to which the node is local or within networks to which the node 106 is not local. For example, the second-tier nodes 310, 312, 314 and the first-tier nodes 302, 304, 306, 308 may be configured to communicate with each other in a mesh network, such that the second-tier nodes 310, 312, 314 and the first-tier nodes 302, 304, 306, 308 can provide communication between all the devices within the mesh network. Each of the nodes 302, 304, 306, 308 may be configured to communicate with each other to create a mesh network. In still further examples, the nodes 310, 312, 314 may be configured to communicate with each other and/or the nodes 302, 304, 306, 308 to facilitate communication between all devices within the network 300.

In one embodiment, the first-tier nodes 302, 304, 306, and 308 are connected directly to a power substation 301 of the network 300. In this way, the phase connection of each of the first-tier nodes 302, 304, 306, and 308 may be known with a high level of confidence, as described above. Some of the first-tier nodes 302, 304, 306, and 308 may be connected to different phases of the power substation 301. For example, first-tier nodes 302 and 308 may be connected to phase A of the power substation 301, while first-tier node 304 may be connected to phase B, and first-tier node 306 may be connected to phase C. First-tier nodes 302 and 308, being connected to the same phase of the power substation 301 may be within wireless communication range of one another and may thereby verify one another's phase synchronization message broadcasts. Verification may include ensuring that the phase synchronization message is received within the wireless range.

Each of the first-tier nodes 302, 304, 306, and 308 are configured to send out (e.g. broadcast) one or more phase synchronization messages, which may be received by the second-tier nodes 310, 312, and 316, for use in determining their own phases. In one embodiment, the first-tier nodes 302, 304, 306, and 308 broadcast the phase synchronization messages upon detecting a zero-crossing event (e.g. a zero crossing of the AC voltage associated with the respective first-tier nodes 302, 304, 306, and 308. The phase synchronization messages may contain a measured phase angle value, a phase name associated with the transmitting node, a transmitting node tier number, a local line frequency, an address of the transmitting node (e.g. a communication address) and transmitting node authentication information. First-tier nodes 302, 304, 306, and 308 may send out a phase synchronization message to all nodes within the coverage area 324 (e.g., to second-tier node 310, second-tier node 312, and second-tier node 314). Second-tier node 310, second-tier node 312, and second-tier node 314 receive the message and then determine a time delta between the receipt of the phase synchronization message and a subsequent zero-crossing of the AC power signal associated with each respective second-tier node 310, 312, 314. The second-tier nodes 310, 312, 314 are further configured to determine their local phase angle based on the time delta, as well as the known phase angle in the phase synchronization message.

Once the second-tier nodes 310, 312, 314 determine the time period between the receipt of the message and a respective zero crossing, they may determine their own phase connection (e.g. determine the phase to which they are connected, such as A, B, C, etc.), according to methods described in greater detail below, and save it to memory 210. Second-tier nodes 310, 312 may also transmit the information to a central controller, such as central controller 110. In some embodiments, the central controller 110 may be one or more of the first-tier nodes 302, 304, 306, 308. In one embodiment, the second-tier nodes nodes 310, 312, 314 may be configured to determine their own tier on the basis of the tier of the node from which they received the phase synchronization message.

Second-tier nodes 310, 312, may also be configured to transmit phase synchronization messages. For example, where the phase of second-tier node 310 is known by second-tier node 310, second-tier node 310 may broadcast a phase synchronization message including a known phase as a declared phase angle, a local line frequency, the tier value of the second-tier node 310, authentication information, as well as an address of the second-tier node 310. The phase synchronization message broadcast by the second-tier node 310 may be received by one or more third-tier nodes, such as third-tier nodes 316, 318. Upon receiving the phase synchronization message from second-tier node 310, third-tier nodes 316, 318 may broadcast their own respective phase synchronization messages, as described above. The phase synchronization messages broadcast by the third-tier nodes 316, 318 may be broadcast based upon the declared phase angle of the second-tier node 310, the receipt time of the phase synchronization message from second-tier node 310, and the predicted local zero-cross time at the receiving third-tier nodes 316, 318.

Similarly, as second-tier node 312 is within the coverage area 324, the phase of second-tier node 312 can be determined based on a phase synchronization message received from a first-tier node. Upon the phase of node 312 being determined, subsequent phase synchronization messages may be broadcasted by node 312, which can be used to determine the phase of other second-tier or third-tier nodes within coverage area 324. This can continue for other nodes with overlapping coverage areas, thereby allowing the phase of additional lower tier nodes to be determined. Additionally, the phase of lower tier nodes may be determined on the basis of the known phase of node 312, as described in further detail below.

Figure 4:
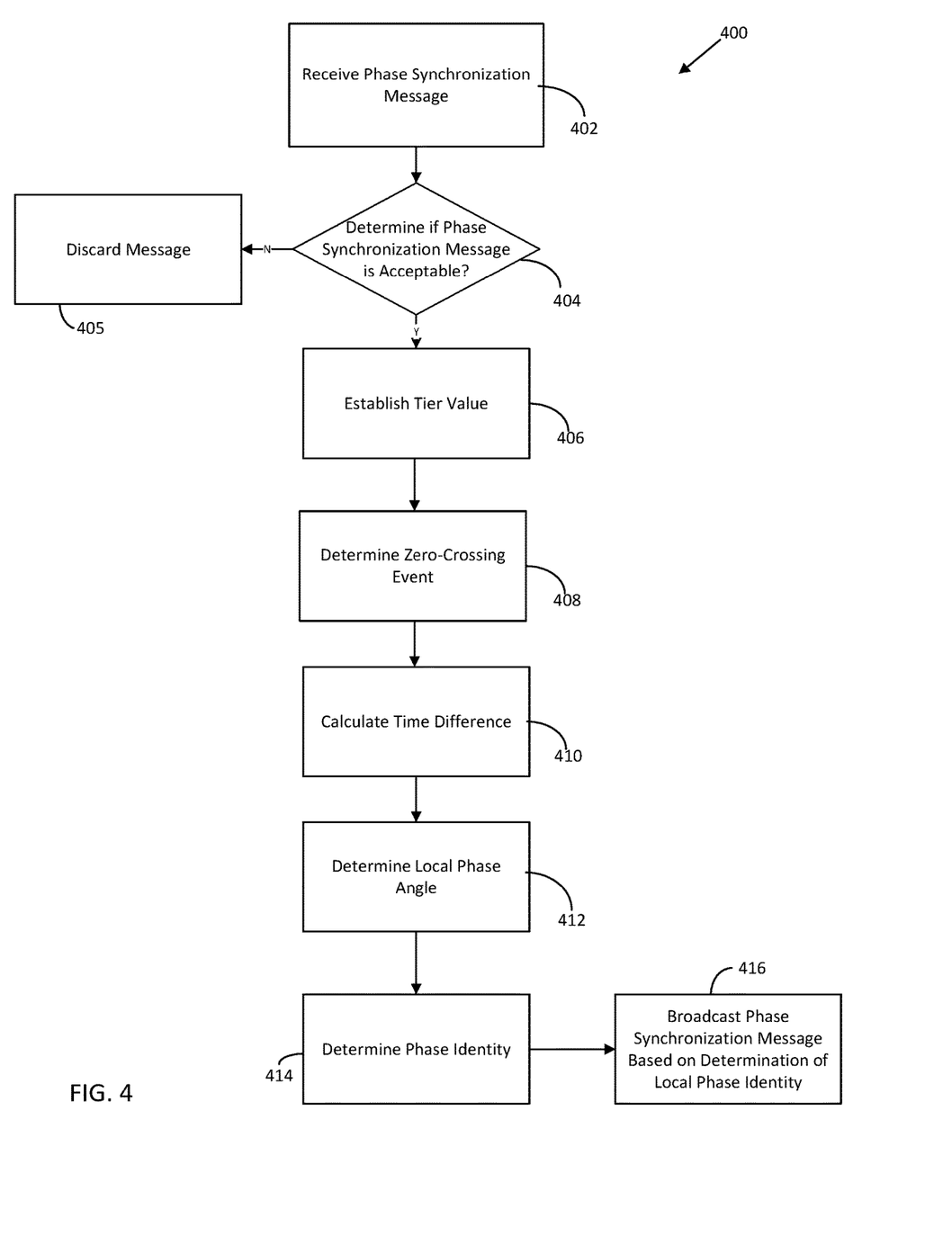
FIG. 4 is a flow chart illustrating one exemplary embodiment of a method for processing phase synchronization signals.

Turning now to FIG. 4, a process 400 for processing a received phase synchronization message is described, according to some embodiments. In one embodiment, the process 400 is performed by a node, such as node 106 described above. While the process 400 is described as being performed by node 106, it is contemplated that one or more other components described herein may be configured to perform the process 400. In one embodiment, the process 400 may be executed by the phase synchronization processing circuit 218, described above. At process block 402, the node 106 receives a phase synchronization message from a transmitting node. In one embodiment, the transmitting node may be another node such as node 106. As described above, the phase synchronization message may include various data, such as a transmitting node tier number, a declared phase angle of the transmitting node, a local line frequency measured at the transmitting node, transmitting node authentication information, a transmitting node address, and the like. This information may be used by the node 106 to determine its own tier value and phase, as described in detail below.

At process block 404, the node 106 determines whether the phase synchronization message should be accepted or discarded based upon information within the phase synchronization message, such as the transmitting node tier value. Where the node 106 does not yet have a verified tier value, or where the tier value of the transmitting node is higher than a known tier value of the node 106 the phase synchronization message is accepted. However, where the transmitting node tier value is equal to or lower than a known tier value of the node 106, the node 106 rejects the received phase synchronization message at process block 405.

At process block 406, the tier value of the node 106 is established and saved in memory 210. Where the tier value of the node 106 is already known, the tier value may be verified based on the tier of the transmitting node. Where the tier value is not known by the node 106 prior to receiving the phase synchronization message, the node 106 sets its tier value as the transmitting node tier value incremented by one. For example, where the tier value of the transmitting node is N, the node 106 determines and save its own tier value as N+1 in memory 210.

At process block 408, the node 106 predicts and/or detects a first zero-crossing event subsequent to receiving the phase synchronization message. A zero-crossing event is a zero-crossing of a sinusoidal AC voltage on a power line associated with the node 106. In one embodiment, the sensors 216 may be configured to detect the zero-crossing event. At process block 410, the node 106 calculates a time difference (delta) between the receipt of the phase synchronization message and the predicted or detected zero-crossing. As wirelessly transmitted phase synchronization messages travel at a very high speed (i.e. approximately the speed of light), there is little or no time delay between the transmission of a phase synchronization message from the transmitting node and its reception by the node 106. Therefore, a phase synchronization message sent on a rising zero-voltage cross of the transmitting node (as described above, and in more detail below) may be accurately correlated, at the receiving node, to the timing of the rising zero-voltage cross of the transmitting node. Thus, a phase delay time 6 is calculated in anticipation of a predicted rising zero-voltage cross at a receiving node using the following equation 1:

$$\delta = (360° \times VCD/VCP - PDProductNullingOfffset + 360) \mod 360 \quad \text{Equation 1}$$

wherein VCP is the known voltage cross periodicity of the AC mains voltage source, VCD is a local delay before a predicted voltage cross, and PDProductNullingOffset is a fixed value representing the delay between the actual, sinusoidal electrical signal, and a mimicking, representative square signal used for analysis. In some embodiments, the PDProductNullingOffset is 12 ms. However, values of more than 12 ms or less than 12 ms are also contemplated. In some cases, a correlation may be made to the timing of a recently detected rising zero-voltage cross at the receiving node, rather than the correlation being made on a delay to a predicted voltage cross (VCD). For example, the sensors 216 may detect a rising zero-voltage cross subsequent to receiving the phase synchronization message. In some instances, the rising zero-voltage crossings are detected by the sensors 216 and stored in the memory 210 along with a time stamp, thereby allowing the node to determine whether a rising voltage zero-cross occurred simultaneously with the rising voltage zero-cross event at the transmitting node.

At process block 410, the determined phase delay time is then correlated to the declared phase angle provided in the received phase synchronization message to produce a local phasor angle in degrees as shown in Equation 2:

$$PhasorAngle = \left( \text{floor} \left( \frac{DeclaredPhaseAngle + \delta + 15°}{30°} \right) \mod 12 \right) \times 30° \quad \text{Equation 2}$$

As used in Equation 2, the DeclaredPhaseAngle is a value presented in the received phase synchronization message that represents the transmitting nodes phase angle relative to a phase of a reference node. For example, where the transmitting node is in exact agreement with the reference node (e.g. having the same phase), the angle would be zero. Where the transmitting node is one phasor away, the value may be 30° or 330°.

This local phasor angle is sometimes referred to as the local phase, phase angle, or local phase connection herein. In response to determining the local phase angle, a phase name (e.g. Phase A, Phase B, Phase C, etc.) of the node 106 may determined at process block 414. In one embodiment, a table, such as Table 1, below, may be used to determine a phase name of the node 106. In one embodiment, the node 106 may make the determination at process block 414. In other embodiments, another device, such as central controller 110, may determine the phase name of the node 106.

TABLE 1

| Phasor Number | Phasor Angle | Phase Name | |
|---|---|---|---|
| | | CW Rotating Utility | CCW Rotating Utility |
| 0 | 0° | A | A |
| 1 | 30° | CA | BA |
| 2 | 60° | −C | −B |
| 3 | 90° | CB | BC |
| 4 | 120° | B | C |
| 5 | 150° | AB | AC |
| 6 | 180° | −A | −A |
| 7 | 210° | AC | AB |
| 8 | 240° | C | B |
| 9 | 270° | BC | CB |
| 10 | 300° | −B | −C |
| 11 | 330° | BA | CA |

The local phasor angle is then broadcast by the node 106 in a new phase synchronization message at process block 416. As described above, the new phase synchronization message may include various data, such as such as a transmitting node tier number, a declared phase angle of the transmitting node, a local line frequency measured at the transmitting node, transmitting node authentication information, a transmitting node address, and the like. In one embodiment, the node 106 transmits the phase angle or phase synchronization message to at least one other node, such as the transmitting node. In other embodiments, the node 106 may transmit the phasor angle or phase synchronization message to a central controller, such as central controller 110 described above. In some examples, the node 106 may generate a message containing the phase difference between the declared phase of the received phase synchronization message and the predicted or detected zero crossing. The message may further include information such as a tier number of the node, a declared phase, sender information, authentication information, a local line frequency, a node identifier, the identification of the device that transmitted the synchronization message, etc. In some embodiments, the message may include a known phase associated with the node, where known.

Figure 5:
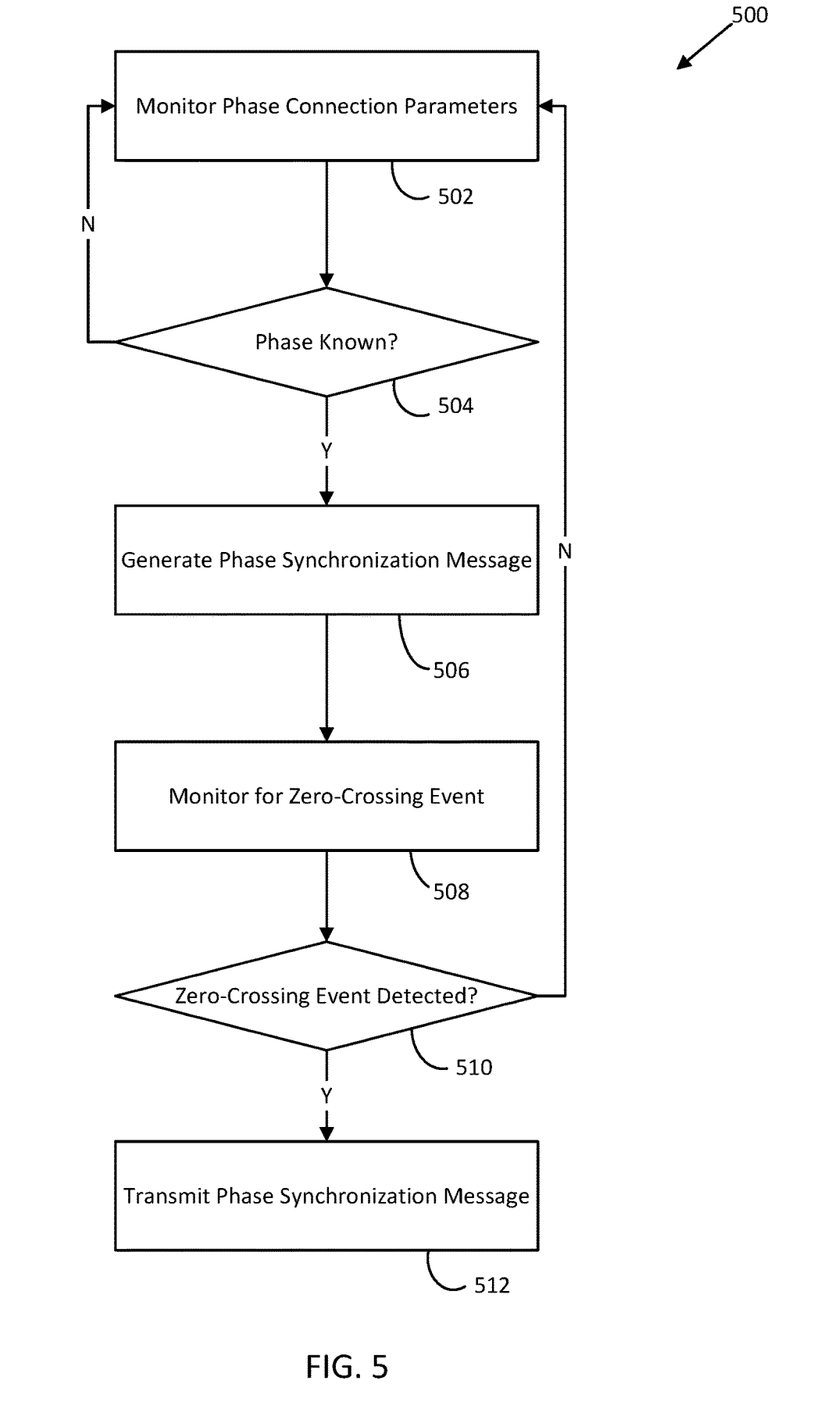
FIG. 5 is a flow chart illustrating one exemplary embodiment of a method for generating phase synchronization signal.

Turning now to FIG. 5, a process 500 for generating and transmitting phase synchronization messages by a node, such as node 106, is described according to some embodiments. At process block 502, the node 106 monitors one or more parameters of a phase of a distribution system associated with the node 106. In one embodiment, the monitored parameter is a voltage. However, other parameters, such as current, temperature, etc. may also be monitored. At process block 504, the node 106, such as via the processing circuit 202, determines whether the node 106 knows which phase it is coupled to in the distribution system. In some examples, the node 106 may be a reference node as described above and will therefore be set to know a phase to which it is coupled. In other embodiments, the node 106 may have previously determined an associated phase using a process similar to process 400 described above. In response to determining that the node 106 does not know the identity of the phase to which the node 106 is coupled, the node 106 continues to monitor the one or more parameters of the phase of the distribution system at process block 502.

In response to determining that the node 106 does know the identity of the phase to which the node 106 is coupled, the node 106 generates a phase synchronization message at process block 506. In one embodiment, the phase synchronization message generation circuit 212 generates the phase synchronization message. As described above, the phase synchronization message may include declared phase information (e.g. the phase identity/name), a measured phase angle, a tier value, an address of the node 106, time data, other monitored parameter data, location data, etc. In one embodiment, the generated phase synchronization message may be stored in the memory 210 of the node 106.

At process block 508, the node 106 monitors for a zero-crossing event on the phase associated with the node 106. At process block 510, the node 106 determines whether a zero-crossing event was detected. In response to determining that no zero-crossing event has not occurred, the node 106 continues to monitor the phase associated with the node 106 for a zero-crossing event at process block 508. In response to determining that a zero-crossing event has occurred, the node 106 transmits the generated phase synchronization message at process block 512. By transmitting during a zero-crossing event, a local phasor angle equivalent to the declared phase angle of the node 106 is be transmitted.

In some embodiments, in process block 512, the node 106 may broadcast a declared phase with adjusted timing based upon their own determined phase and known zero-crossing. Sometimes, the node 106 determines that the frequency spectrum (e.g. the available transmitting frequencies assigned to the node 106) to be crowded at the particular timing at which it normally broadcasts a declared phase angle equal to its own local phasor angle. In such cases, the node 106 may broadcast a declared phase angle not equal to its own by selecting a random number between 0 and 11, or any equivalent selection process. Each of the 12 selectable numbers may serve as an index for a different phase angle. For example, 0 may correspond to 30°, 1 may correspond to 60°, 3 may correspond to 90°, and so on. Having randomly or intentionally selected a declared phase angle other than its own phase angle, node 106 may determine a pertinent broadcast time for an appropriate phase synchronization message by calculating a transmit delay, as shown in Equation 3, below.

$$TXD = \frac{VCP}{12}\left(\left(\left(\frac{DeclaredPhaseAngle}{30°}\right) - SelfPhaseNumber + 12\right)\\ mod12\right) \quad \text{Equation 3}$$

The SelfPhaseNumber is the randomly or intentionally chosen index number described above. The transmit delay TXD is then added to the current time by the node 106 in order to produce a future time at which the phase synchronization message containing a modified declared should be transmitted. The node 106 may then transmit the phase synchronization message at that future time.

In some cases, a node 106 may be battery powered or powered by renewable energy and may simply act as a "store and forward" device that receives phase synchronization messages, stores them, and attempts to retransmit them, thus. In such cases, the phase synchronization message may contain a LineFreq measurement to account for error slew rate in a local clock while making the calculations described above. These battery powered or renewable energy powered nodes 106 may be transient in that they may only be powered for a limited amount of time. Still, this type of node 106 may be useful for increasing the range of reference nodes 106.

In some cases, the power distribution network 104 may be tampered with or modified such that the phase of certain nodes 106 changes. In such cases, the nodes 106 may, in the course of identifying their own phase via routine wireless communication, determine that their own phase has changed, and alert the central controller 110 of this detected phase change via wired or wireless communication.

In some cases, a certain node 106 may be equipped with a GPS receiver, after determining its own phase according to the methods disclosed herein, may publish its phase and GPS data to the central controller 110. Additionally, the node 106 may be equipped with sensors to monitor its local power signal and phase. A node 106 of this type may publish any monitored data to the central controller 110 as well.

In some embodiments, a node 106 may request information, such as phase synchronization messages, from other devices within a power distribution system when the node 106 does not know the phase to which it is connected. For examples, in a new installation, or following a loss of power situation, a node 106 may either not know, or lose knowledge of, the phase to which it is connected. In the case of a power loss situation, the node 106 may have previously known a phase to which it was connected, but cannot know the phase with any degree of certainty after a power loss situation as the node 106 may have been moved to a different phase, etc. Accordingly, the node 106 may want to determine its phase actively instead of waiting to receive a broadcasted phase synchronization message.

Figure 6:
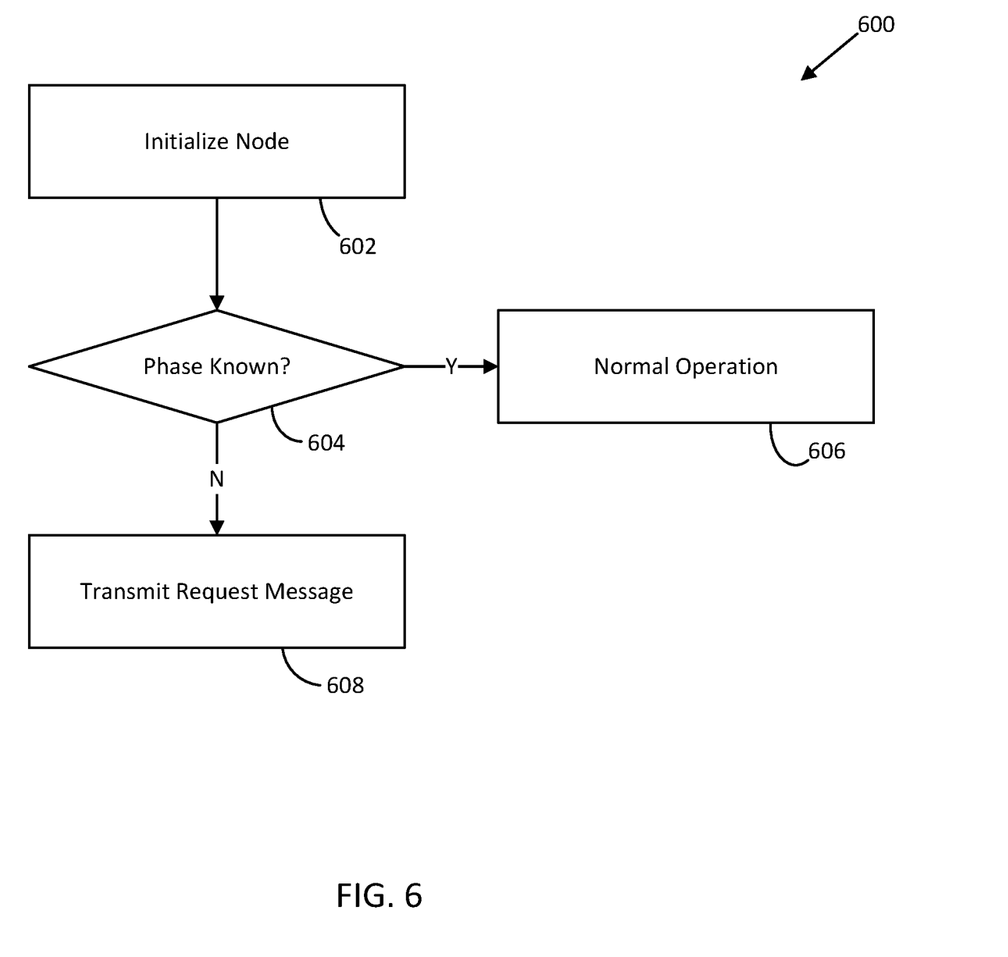
FIG. 6 is a flow chart illustrating one exemplary embodiment of a method for requesting a phase synchronization signal.

Turning now to FIG. 6, a process 600 for requesting a phase synchronization message is shown, according to some embodiments. In one embodiment, the process 600 is performed by a node, such as node 106. However, one or more other devices described herein may perform the process 600. In one embodiment, the message request circuit 220 is responsible for executing the process 600 in conjunction with the processing circuit 202.

At process block 602, the node 106 is initialized. The initialization may occur during the initial setup and installation of the node, and/or after a loss of power situation. At process block 604, the node 106 determines whether it knows to which phase of a power distribution system it is connected. As noted above, after a power loss or during an initial installation, the node 106 may not know with any certainty to which phase it is connected, even where the node previously knew its associated phase. However, in some instances a user may set a flag or provide an affirmative indication of the phase to which the node 106 is coupled. For example, where the node 106 is a reference node, the phase may be set within node 106. In response to determining that the phase of the node 106 is known, the node 106 operates normally at process block 606. In response to determining that the phase of the node 106 is not known, the node 106 transmits a request for phase data, such as a phase synchronization message described above. In one example, the request is transmitted via the communication interface 204. In some examples, the request for phase data may include an address of the node 106, a time the request was sent, a tier value (if known) of the node 106, etc.

In some examples, the request is configured to be received by other devices, such as a DCU. However, in other embodiments, other nodes, such as reference nodes may be configured to receive the request. In some examples, where a supervisory device, such as a DCU device receives the request, the supervisory device may then send out a subsequent message to any nodes within its communication range to request that phase synchronization messages from higher tiered nodes (or nodes knowing their associated phase).

Figure 7:
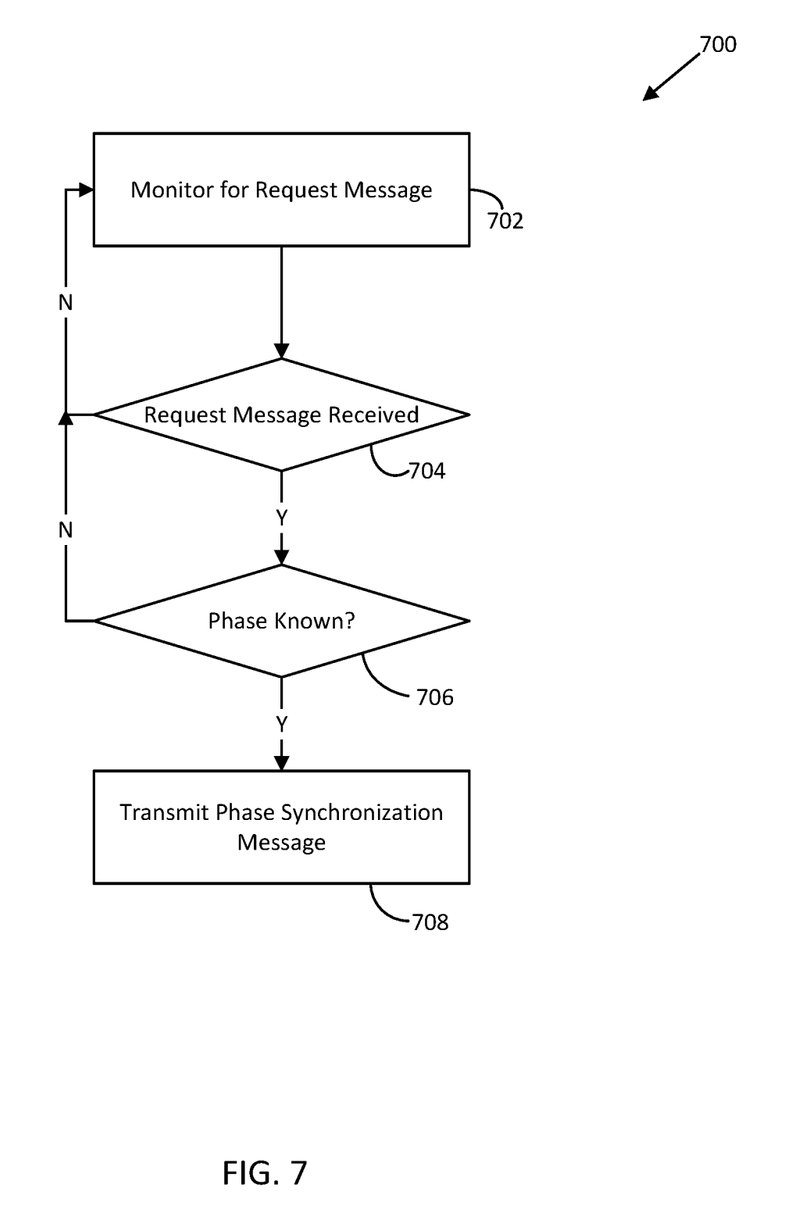
FIG. 7 is a flow chart illustrating one exemplary embodiment of a method for responding to a request for a phase synchronization signal.

Turning now to FIG. 7, a process 700 for transmitting phase synchronization messages in response to receiving a transmitting request is shown, according to some embodiments. In one embodiment, the message request circuit 220 performs the process 700 in conjunction with the processing circuit 202. At process block 702, a node 106 monitors for a transmitted request. In some examples, the transmitted request may be a request as described above in regards to process 600 described above. In some embodiments, the request may be a subsequent message transmitted by a supervisory device, such as a DCU. The request may be received via the communication interface 204.

At process block 704, the node 106 determines whether a request has been received. In response to determining that no request has been received, the node 106 continues to monitor for a request at process block 702. In response to determining that a request has been received, the node determines whether a phase of the node 106 receiving the request is known at process block 706. In response to determining that the phase of the node 106 receiving the request is not known, the node 106 continues to monitor for received requests at process block 702. In response to determining that the phase is known, the node 106 transmits a phase synchronization message at process block 708. In one embodiment, the node 106 transmits the phase synchronization message as described above in regards to process 500. One or more nodes 106, including the node transmitting the request, may then receive the transmitted phase synchronization message, as described above.

In addition to determining whether a phase associated with the node 106 is known, the node 106 may also determine whether the tier value is higher (e.g. closer to the AC power source) than a tier value of the transmitting node. In response to determining that the tier value is not higher than the transmitting node, the node 106 may not proceed with transmitting the phase synchronization message at process block 708.

Various features and advantages of the invention are set forth in the following claims.

What is claimed is:

1. A node in a power distribution system comprising:
an electrical connection to a single phase power signal from an AC mains power source;
a wireless communication interface configured to receive a first phase synchronization message; and
a controller, the controller configured to:
determine whether the first phase synchronization message is acceptable;
in response to determining the first phase synchronization message is acceptable, detecting a zero-crossing event on the single phase power signal subsequent to the receipt of the first phase synchronization message;
calculate a time difference between the receipt of the first phase synchronization message and the detected zero-crossing event;
determine a local phase angle based on the time difference; and
establish an identity of the single phase power signal based on the local phase angle,
wherein the first phase synchronization message includes a tier value, and
wherein the first phase synchronization message is determined to be acceptable based on a tier value of the first phase synchronization message having a higher tier value than a tier value of the node, and wherein a higher tier value represents a shorter distance to the AC mains power source than a lower tier value.

2. The node of claim 1, wherein the node is embedded in an electrical utility meter.

3. The node of claim 1, wherein the first phase synchronization message further includes, the determined phase angle of the node, a frequency of the single phase power signal, and a communication address of the node.

4. The node of claim 1, wherein the controller is further configured to transmit a second phase synchronization message in response to establishing the identity of the single phase power signal, wherein the second phase synchronization message includes at least the tier value of the node, the determined local phase angle, and the identity of the single phase power signal.

5. The node of claim 1, wherein the controller is further configured to:
determine whether a phase identity of the single-phase power signal is known; and
transmit a request message in response to determining that the phase identity of the single-phase power signal is not known, wherein the request message is a request for one or more requested phase synchronization messages.

6. A method for determining a phase identity of a node device coupled to a phase of a multi-phase AC distribution system, the method comprising:
receiving a first phase synchronization message;
determining whether the first phase synchronization message is acceptable;
detecting a zero-crossing event on the phase subsequent to the receipt of the first phase synchronization message in response to determining that the first phase synchronization message is acceptable;

calculating a time difference between the receipt of the first phase synchronization message and the detected zero-crossing event;

determining a local phase angle based on the time difference; and establishing an identity of the phase based on the local phase angle, wherein the first phase synchronization message includes a tier value, and wherein the first phase synchronization message is determined to be acceptable based on a tier value of the first phase synchronization message having a higher tier value than a tier value of the node, and wherein a higher tier value represents a shorter distance to an AC mains power source than a lower tier value.

7. The method of claim 6, wherein the first phase synchronization message further includes a tier value, the determined phase angle of the node, a frequency of the single-phase power signal, and a communication address of the node.

8. The method of claim 7, further comprising determining the tier value of the node by increasing the tier value of the first synchronization message by one.

9. The method of claim 6, further comprising transmitting a second phase synchronization message in response to establishing the identity of the single phase power signal, wherein the second phase synchronization message includes at least the tier value of the node, the determined local phase angle, and the identity of the single phase power signal.

10. The method of claim 6, further comprising:

determining whether a phase identity of the single phase power signal is known; and transmitting a request message, wherein the request message is a request for one or more requested phase synchronization messages.

11. A monitoring system for a power distribution network, the system comprising:

a first node coupled to a first phase of the power distribution network, wherein the first node is configured to:

determine whether an identity of the first phase is known;

generate a first phase synchronization message in response to determining that the identity of the first phase is known;

monitor the first phase for a zero-crossing event;

transmit the first phase synchronization message in response to detecting the zero-crossing event;

a second node coupled to a second phase of the power distribution network, wherein the second node is configured to:

receive the first phase synchronization message;

determine whether the first phase synchronization message is acceptable;

detect a zero-crossing event on the second phase subsequent to the receipt of the first phase synchronization message;

calculate a time difference between the receipt of the first phase synchronization message and the detected zero-crossing event; and determine a local phase angle based on the time calculated time difference; and establish an identity of the second phase based on the local phase angle wherein the first phase synchronization message includes a tier value, and wherein the first phase synchronization message is determined to be acceptable based on a tier value of the first phase synchronization message having a higher tier value than a tier value of the second node, and wherein a higher tier value represents a shorter distance to an AC mains power source than a lower tier value.

12. The system of claim 11, wherein the second node is further configured to transmit a second phase synchronization message in response to establishing the identity of the second phase, and wherein the second phase synchronization message includes at least the tier value of the second node, the determined local phase angle, and the identity of the second phase.

13. The system of claim 11, wherein the second node is further configured to determine the tier value of the second node by increasing the tier value of the first synchronization message by one.

14. The system of claim 11, wherein the first phase synchronization message further includes the determined phase angle of the first node, a frequency of the first phase, and a communication address of the first node.

* * * * *